United States Patent Office 3,553,920
Patented Jan. 12, 1971

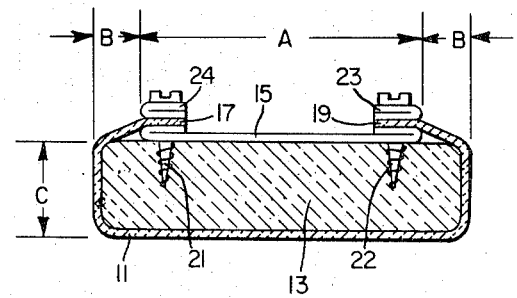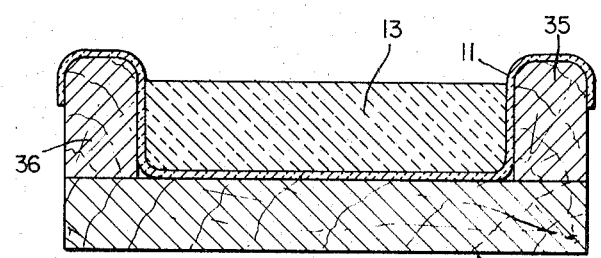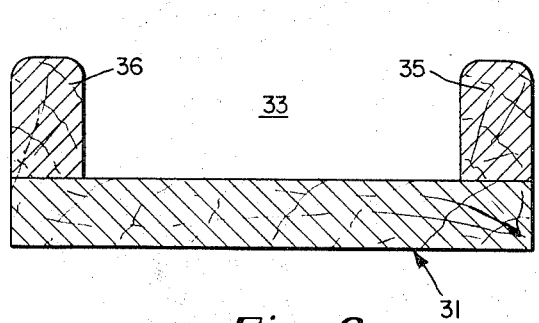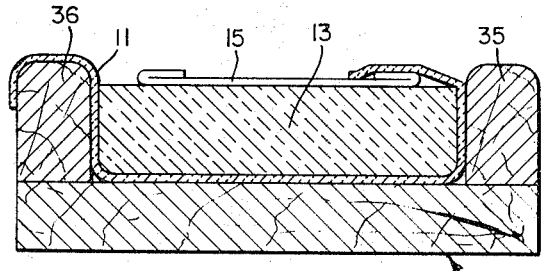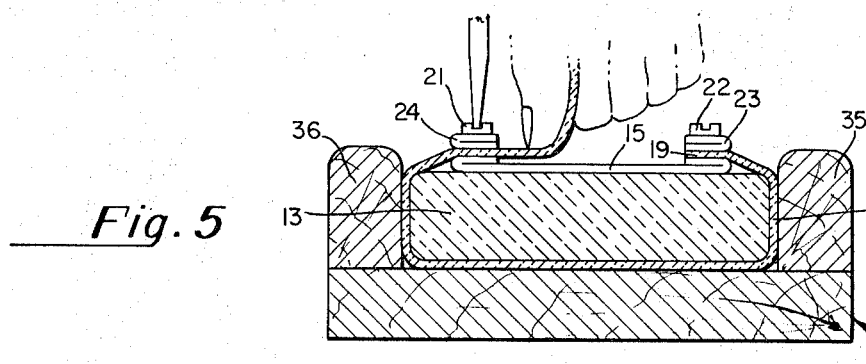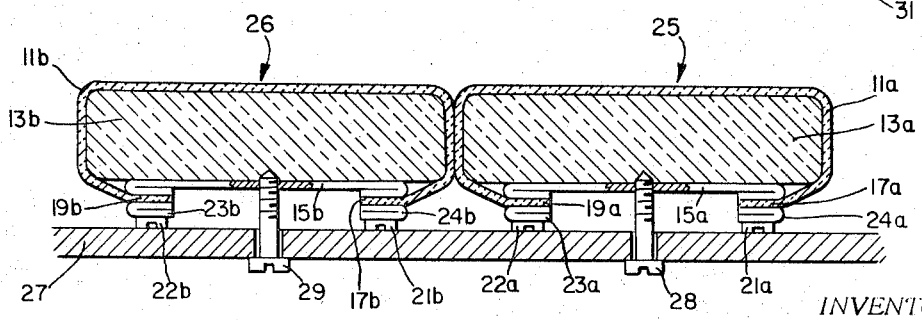

3,553,920
INSULATION MODULES FOR INSULATING WALL SURFACES
Stephen F. Cole, Jr., 26 Meadowbrook Lane, Chalfont, Pa. 18914
Filed July 10, 1967, Ser. No. 652,100
Int. Cl. E04b 1/62
U.S. Cl. 52—506                                9 Claims

ABSTRACT OF THE DISCLOSURE

The present invention provides a means for fabricating a thermal insulation wall by the addition or interchanging of insulation modules. In addition, the invention teaches a method for fabricating the insulation modules.

This invention relates to thermal insulation means and more particularly to modular thermal insulation structures for mounting on the walls of devices requiring thermal insulation, such as furnaces.

BACKGROUND

In furnace structures (or thermally insulated structures in general) there has long been a desirability or a requisite for effectively containing the heat therein for at least two reasons. It is quite apparent that if the heat is permitted to escape to the "outside world," the furnace, for whatever its intended purpose, is inefficient. Secondly, the heating of the "outside world" per se can be a source of discomfort to workers and possibly a source of damage to items disposed in proximity to the furnace. There are, of course, other valid reasons for employing thermal insulation.

In industrial furnaces, there has been an interest in effecting a thermal insulation of the hot chamber from the outside environment by employing layers of felt or fiber materials having low thermal conductivity and high resistance to thermal damage. These efforts have been thwarted for a number of reasons one of which is the inability of such materials to be self-supporting, another of which has been the inability to readily remove "exhausted" or worn-out or damaged sections of said material.

The present invention provides a means to employ these non-rigid thermal insulation materials in a manner which makes them very useful as an insulation wall.

SUMMARY

The present invention provides insulation modules which are made up of an outer covering of heat resistant cloth or mesh such as graphite cloth or silica cloth or the like. This outer covering contains, or houses, a filler material made up of strips or layers of felt, or fibers of low thermal conductivity materials such as graphite, silica, or the like. The outer covering in combination with the filler strips of low thermal conductivity material is mounted on a rigid base, such as a metal base which is in turn secured to the wall of the furnace (or other particular device).

The method for fabricating such modules is accomplished by employing a tool having a valley section between two ridges. The valley section has a shape which approaches the shape of the module. The outer covering is set in the valley of the tool with its edges on the ridges thereof and the filler of low thermal conducting material is placed on the cover as a second step. Thereafter a backplate is located on the filler of low thermal conducting material and the edges of the covering are secured to the backplate to complete the module. The description is made in connection with a furnace but the invention is indeed applicable to structures which need thermal insulation, such as space vehicles, refrigerators, etc.

The novel features of the invention will be better understood by studying the following text in conjunction with the drawings, in which:

FIG. 1 shows an end view of an assembled module;
FIG. 2 shows a tool for fabricating the module;
FIG. 3 shows the module after two steps of the fabrication have been completed;
FIG. 4 shows the module after two more steps of fabrication have been completed;
FIG. 5 shows the covering being secured to the backplate;
FIG. 6 shows the end view of two modules secured to a furnace wall.

Consider FIG. 1, which shows an end view of a thermal insulation module. In FIG. 1, the outside covering 11 is preferably made of a cloth material such as graphite, silica or alumina, which are heat resistant, i.e. are not readily damaged when subjected to high temperatures. The outside covering 11 is shaped to hold the low thermal conducting filler material 13.

The low thermal conducting material 13 can be composed of many basic materials such as felt, fiber glass, and the like. The filler material 13 need only have the properties of low thermal conductivity and pliability as a mass. In addition the filler material should be of such a composition as to be capable of being packed to provide vertical and lateral rigidity when the module is complete.

Located on the upper end of the filler material 13 is a base plate 15. The base plate 15 has the two ends 17 and 19 of the outer covering 11 secured thereto. In addition, the base plate 15 is secured to the filler material 13 by virtue of the screws 21 and 22. Other forms of securing means could be employed such as studs, clamps and the like, but in the preferred embodiment, the screws 21 and 22 are passed through clamps 23 and 24, through the outer covering ends 17 and 19, through the backplate 15 into the insulation material 13.

The width of the module can vary but in the preferred embodiment is one inch from clamp end to clamp end (length A) and one half inch from clamp end to module end (length B). This width has seemed preferable because it provides good rigidity for each module, while at the same time permits a reasonable amount of compressibility between adjacent modules. If the module can be compressed somewhat they can be mounted and squeezed together to form a very tight fit. A tight fit of course eliminates high heat loss by direct radiation through the abutting ends of the modules. In addition this size has been found to be ideal for liming round or curved inner surfaces since the small increment of two inches over all readily conforms to curvature.

The depth or thickness of the module will vary as a function of the "K" factor or thermal conductivity of the insulating material. The thickness of said material is chosen to establish a predetermined thermal gradient across the insulation from "hot face" to "cold face."

The length of the module is quite variable and need only be controlled by the dimensions of the furnace and the feasibility of hanging a module.

Once a module has been assembled it can be mounted with other modules as depicted in FIG. 6. The numerals are the same as in FIG. 1, excepting for the right hand modules, they are further identified by a small "a" while the left hand module is identified by a small "b." As can be seen in FIG. 6, the modules 25 and 26 are secured to the furnace wall 27 by the screws 28 and 29. It should be understood that as the length of the module increases, there will be an additional number of screws such as screws 28 and 29 employed.

It should also be apparent that when a module has become "spent" or worn out, this module can simply be removed by taking out the bolts 28 or 29 or their counterparts along the length of the module. A new module is simply installed and newly bolted to the furnace wall 27.

Consider now FIG. 2, which depicts the basic tool 31 for fabricating a module. The tool 31 can be made of any rigid material such as wood, plastic, metal or the like. The valley 33 of the tool 31 is shaped to approximate the shape of a module. The ridges 35 and 36 serve, as will be seen, to initially hold the outer covering for the first two steps of the fabrication. Now, while the valley 33 approximates a rectangular shape, it should be understood that it could take on other shapes.

FIG. 3 depicts the tool 31 with the outer covering 11 placed therein and with the filler insulation material 13 located within the outer covering. It should be noted that the outer covering is cut to hang completely over the tops of the ridges 35 and 36. Having once taken the first two steps of placing the outer covering in the tool 31 and having loaded the outer covering with the insulation 13, the module is ready for the backplate.

In FIG. 4, we find that the backplate 15 has been located on the insulating material 13 and the right end of the covering material has been removed from ridge 35 and placed over the right folded edge of the backplate 15. The module is now ready to have the right side of the outer covering secured to the backplate and to have the left side of the outer covering pulled taut. FIG. 5 shows this.

In FIG. 5, it will be noted that the right end of the outer covering has been trimmed to fit the folded edge of the backplate as well as the edge of the clamp 23. The clamp 23 is screwed tight to the backplate and to the insulation, thus holding the outer covering tight against the insulation material 13. Next the outer covering is pulled tight over the rounded edge of the fold on the left hand side of the module. This pulling of the covering "firms up" the module and the screw 21 secures the taut outside cover to the backplate and to the insulation material. The outer cover is then trimmed and the module is complete for mounting in the furnace.

It should be apparent that the tool 31 is as long as the module and can be of varying lengths, i.e, there can be many tools to permit the fabrication of many different sizes of modules. In addition, the tool width, depth and length can be simply adjusted by employing an adjustable tool.

While the description deals with filler material of low thermal conductivity, it should be understood that materials of high reflectivity can be employed as filler material and are considered herewith to be heat insulating materials. For instance, fibers, sheets or foil of such materials as high temperature alloys, molybdenum, tantalum, tungsten, columbium and the like can be used.

The embodiments of the invention in which an exclusive property or privilege is claimed are defined as follows:

1. A thermal insulation module to be used on the wall of a furnace comprising in combination: a filler section composed of heat insulating material, said filler section having length, width and depth dimensions, said depth dimension determined by the thermal conductivity of said heat insulating material whereby heat applied to a first width side is substantially inhibited from being transmitted to the width side of the filler section lying opposite said first width side; outer covering means of heat resistant material formed to cover one width side and two depth sides of said filler section; back plate means having first and second surfaces respectively along its length, width and depth dimensions, said back plate means disposed to have its entire first surface along its width and length directly in contact with said filler section; means securing said outer covering means to said back plate means at its second width and length surface; and securing means located on said back plate means to enable said module to be secured to a wall.

2. A thermal insulation module according to claim 1 wherein said outer covering is made from the group of graphite cloth, silica cloth, alumina cloth and carbon cloth.

3. A thermal insulation module according to claim 1 wherein said outer covering is made from the group of graphite mesh, silica mesh and alumina mesh.

4. A thermal insulation module according to claim 1 wherein said filler material is of the group of graphite fibers, silica fibers, alumina fibers, zirconia fibers and carbon fibers.

5. A thermal insulation module according to claim 1 wherein said filler section is fabricated from the group of high temperature alloys, molybdenum, tantalum, tungsten and columbium.

6. A thermal insulation module according to claim 1 wherein said back plate means is a metal back plate and wherein there is further included bolts and brackets which simultaneously secure the outer covering to said back plate and secure said back plate to said filler material.

7. A thermal insulation module according to claim 1 wherein said module is approximately two inches wide.

8. A thermal insulation module according to claim 1 wherein said securing means is a threaded aperture to receive a screw-like member for securing said module to a wall.

9. A thermal insulation module according to claim 1 wherein said outer covering is flexible.

References Cited

UNITED STATES PATENTS

| | | | |
|---|---|---|---|
| 3,070,196 | 12/1962 | Switzgable | 52—404 |
| 3,364,639 | 1/1968 | Davenport | 52—511X |
| 2,028,253 | 1/1936 | Spafford | 161—152 |
| 2,198,620 | 4/1940 | Irvine | 161—152 |

PRICE C. FAW, JR., Primary Examiner

U.S. Cl. X.R.

52—404, 596; 161—43, 152